April 1, 1958 W. R. BELL 2,828,652
ENGINE DRIVEN WINDSHIELD WIPER DRIVE
Filed March 31, 1954 3 Sheets-Sheet 1
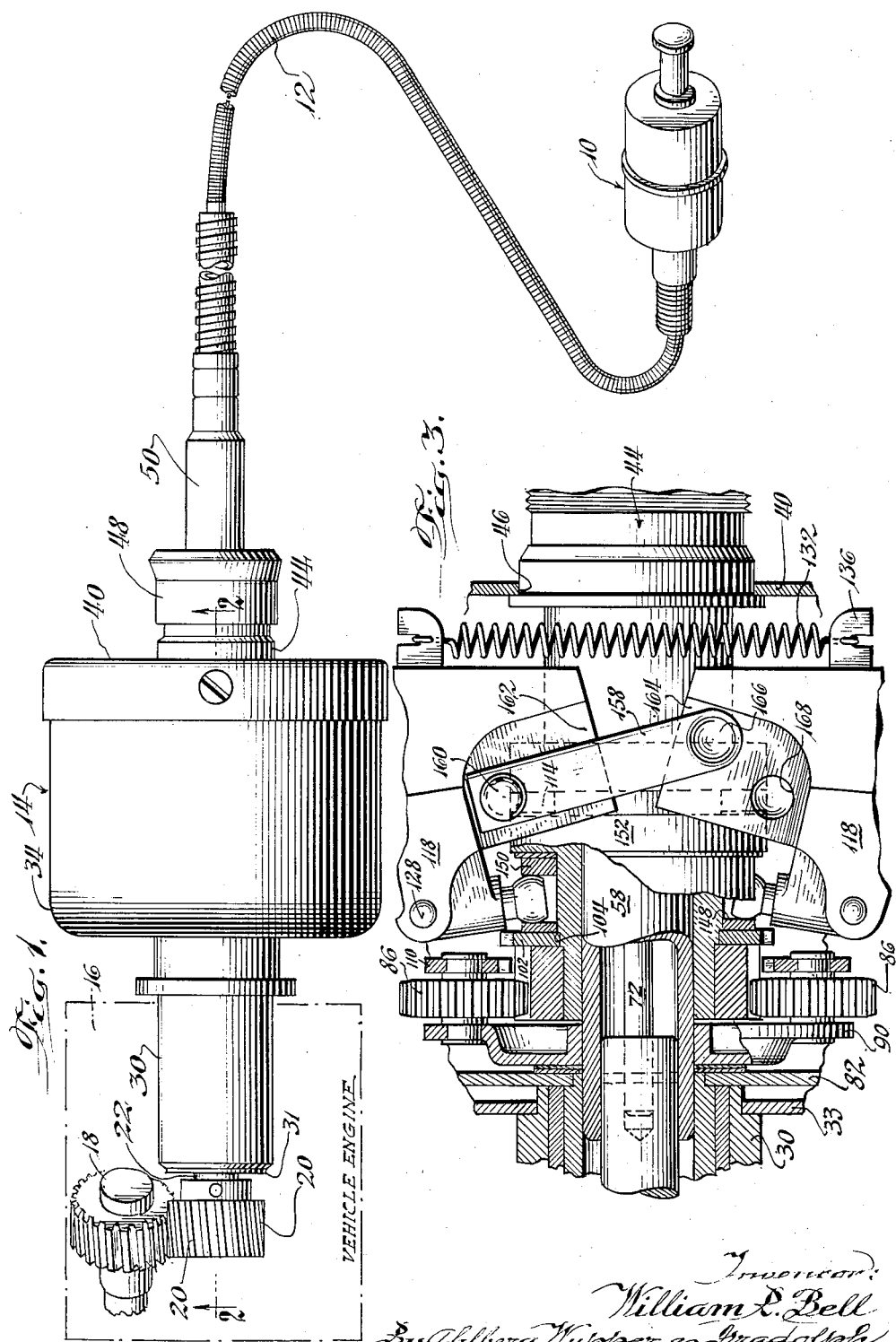

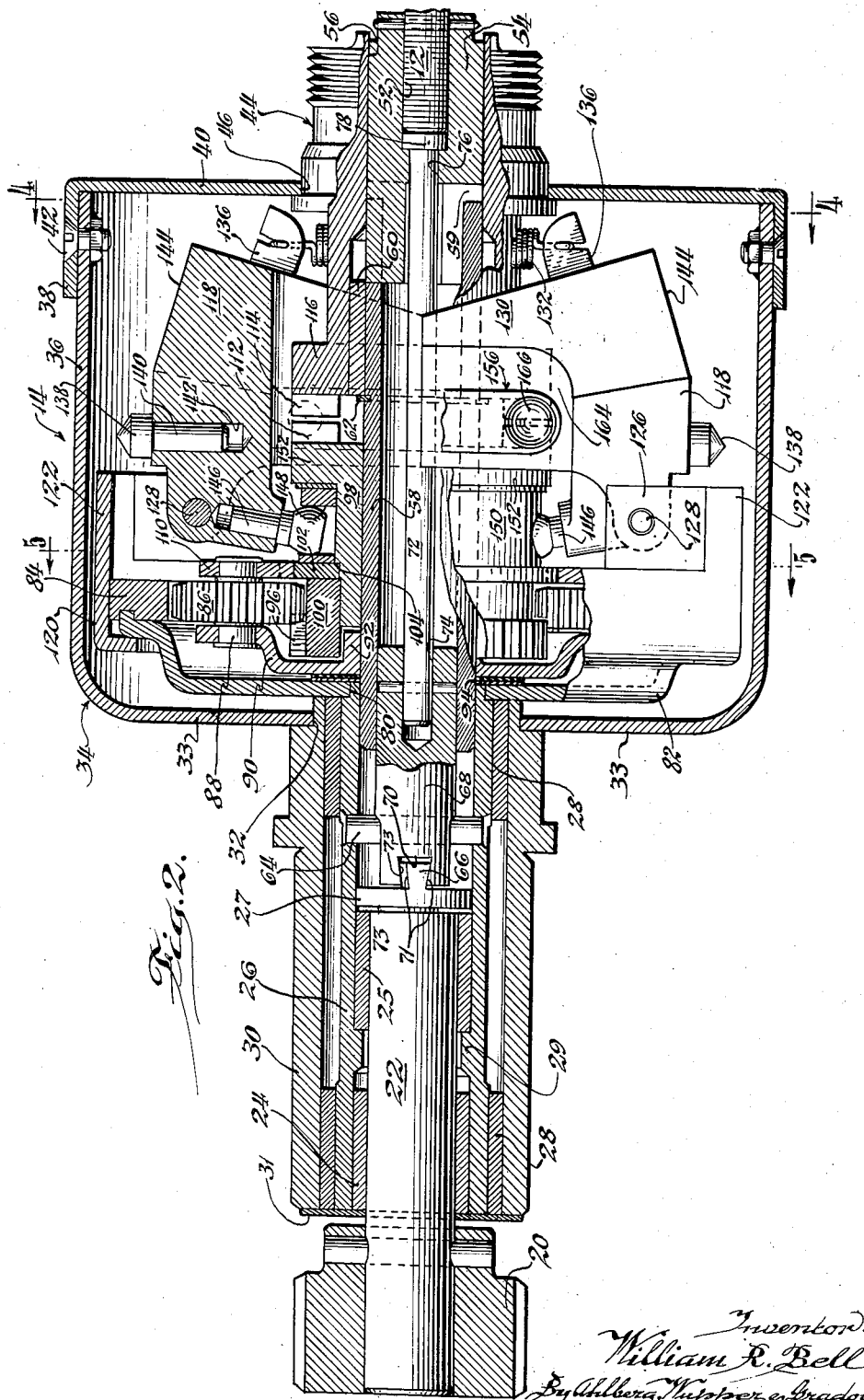

April 1, 1958 W. R. BELL 2,828,652
ENGINE DRIVEN WINDSHIELD WIPER DRIVE
Filed March 31, 1954 3 Sheets-Sheet 3

United States Patent Office 2,828,652
Patented Apr. 1, 1958

2,828,652

ENGINE DRIVEN WINDSHIELD WIPER DRIVE

William R. Bell, Skokie, Ill., assignor to Stewart-Warner Corporation, Chicago, Ill., a corporation of Virginia Application March 31, 1954, Serial No. 420,028

1 Claim. (Cl. 74—752)

The present invention relates to engine driven vehicle accessories and more particularly to engine driven windshield wipers of the general type shown in U. S. Patent to J. B. S. Dahlgren, No. 2,600,622.

Engine driven windshield wipers commonly operate at a speed proportional to the vehicle engine speed. This gives rise to the problem of maintaining a satisfactory wiper speed when the engine is running slowly without overspeeding the wiper when the engine is running fast.

One object of the invention is to provide for mechanically operating a windshield wiper or other vehicle accessory directly from the vehicle engine, a speed compensating drive of an improved, compact construction which is disengageably connected with the engine by axial control movement of a rotary shaft that transmits power to the accessory.

Other objects and advantages will become apparent from the following description of the form of the invention shown in the drawings, in which:

Figure 1 is a side view of an engine driven vehicle accessory incorporating the invention, the vehicle engine and the accessory unit both being illustrated diagrammatically;

Fig. 2 is a longitudinal sectional view of the accessory drive taken along line 2—2 of Fig. 1;

Fig. 3 is a fragmentary longitudinal sectional view showing the accessory drive shifted to a lower output speed position;

Figure 4:
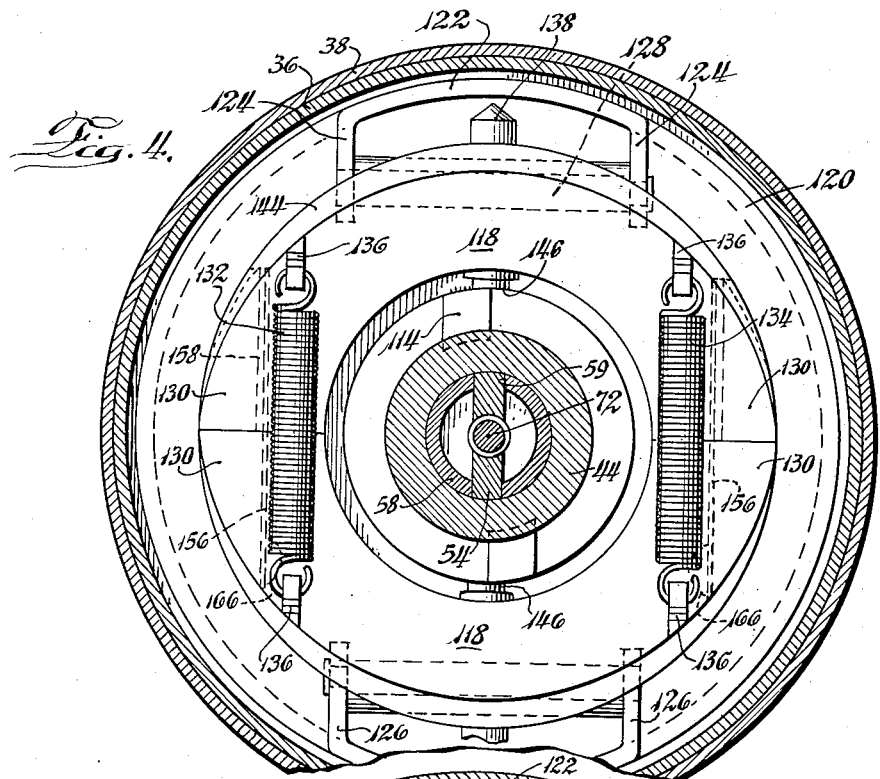
Fig. 4 is a transverse sectional view taken along line 4—4 of Fig. 2.

As shown in the partially diagrammatic view of Fig. 1, the illustrated embodiment of the invention comprises a windshield wiper mechanism 10 of the type shown in the previously mentioned Patent No. 2,600,622, operated through a flexible shaft 12 by a driving mechanism 14 suitably mounted on the vehicle engine 16 and driven by a spiral gear 18 rotated by the engine. The gear 18 meshes with a gear 20 on the outer end of a short horizontal shaft 22 journaled by two sleeve bearings 24, 25 in a hollow driving sleeve 26. Normal rotation of the gear 18 in the clockwise direction (with reference to Fig. 1) creates an outward thrust in the gear 20 and the shaft 22, which is transmitted by an annular collar 27 on the inner end of the shaft to the bearing 25. The end of the bearing 25 opposite the shaft collar abuts against an internal annular shoulder 29 on the driving sleeve 26.

The driving sleeve 26 is journaled by two sleeve bearings 28 in a hollow support sleeve 30. The ends of the sleeve 26 and the shaft 22 adjacent the gear 20 are covered by a sealing washer 31 encircling the shaft. The other end of the support sleeve 30 is necked down sharply and fastened into a central aperture 32 in the vertical end 33 of a cupped casing member 34 having a cylindrical wall 36 extending horizontally away from the gear 20.

The outer peripheral edge of the wall 36 extends into a circumferential flange 38 on a circular plate 40 covering the open end of the casing member 34. Retaining screws 42 extend through the flange 38 and the wall 36.

A generally cylindrical support member 44 fixed in a central aperture 46 of the plate 40 in axial alignment with the sleeve 30 extends both inwardly and outwardly of the plate. The outer end of the member 44 is externally threaded and shaped to receive a collar 48 connecting the covering sheath 50 of the flexible shaft 12 to the member, Figs. 1 and 2. The adjacent end of the shaft 12 is pinned into a counterbore 52 in the outer end of a driven member 54 journaled in an axial bore 56 in the support member 44.

An intermediate driving sleeve 58 is journaled at opposite ends in the inner end of the driving sleeve 26 and in a bearing 60 supported in the counterbored inner end of the support member 44, which extends a substantial distance inwardly of the casing plate 40. The inner end of the driven member 54 and the adjacent end of the sleeve 58 are longitudinally slotted and fitted together as at 59 to form an axially separable rotary connection therebetween. Axial movement of the intermediate sleeve 58 toward the plate 40 is limited by a snap ring 62 on the sleeve which engages the inner end of the bearing 60.

The end of the intermediate sleeve 58 journaled in the driving sleeve 26 stops short of a transverse coupling pin 64 mounted in the driving sleeve somewhat inwardly of the inner end of the engine driven shaft 22.

The coupling pin 64 is clutched to a driving projection 66 on the inner end of the shaft 22 by a cylindrical clutch member 68 slidably mounted in the adjacent end of the intermediate sleeve 58. The outer end of the clutch member 68 is bifurcated to straddle the coupling pin 64. Beyond the pin 64 the clutch member forms a recess 70 shaped to receive the shaft projection 66.

In the preferred construction shown, the driving projection 66 has a blade-like shape extending transversely across the inner end of the shaft 22. The opposite sides 71 of the projection diverge away from each other toward the outer end of the projection. The inlet of the recess 70 has a width sufficient to admit the thickened outer end of the projection 66. Opposite sides 73 of the recess are slightly undercut to mate with opposite sides 71 of the projection when torque is applied through the projection 66 to the clutch member 68. This shaping of the coacting parts urges the member 68 firmly into its clutched position.

The clutch member 68 is connected to the driven member 54 by a rod 72 having one end pinned in a axial bore 74 in the inner end of the clutch member. The other end of the rod 72 extends through an axial bore 76 in the driven member 50 to an enlarged head 78 on the rod, which is freely rotatable in the counterbore 52 between the bottom of the counterbore and the inner end of the flexible shaft 12. The clutch member 68 is shifted into and out of clutched engagement with the driving shaft projection 66 by axial movement of the shaft 12 produced by suitable manual control structure (not shown) such as that shown in the previously mentioned Dahlgren Patent No. 2,600,622.

The inner end of the driving sleeve 26 is sharply necked down and fastened in a central aperture 80 in a driving disc 82 having abutting contact with the inner end of the support sleeve 30. The peripheral edge of the driving disc 82 is offset axially from the end 33 of the casing member 34 and fastened to a ring gear 84 having internal gear teeth.

Figure 5:
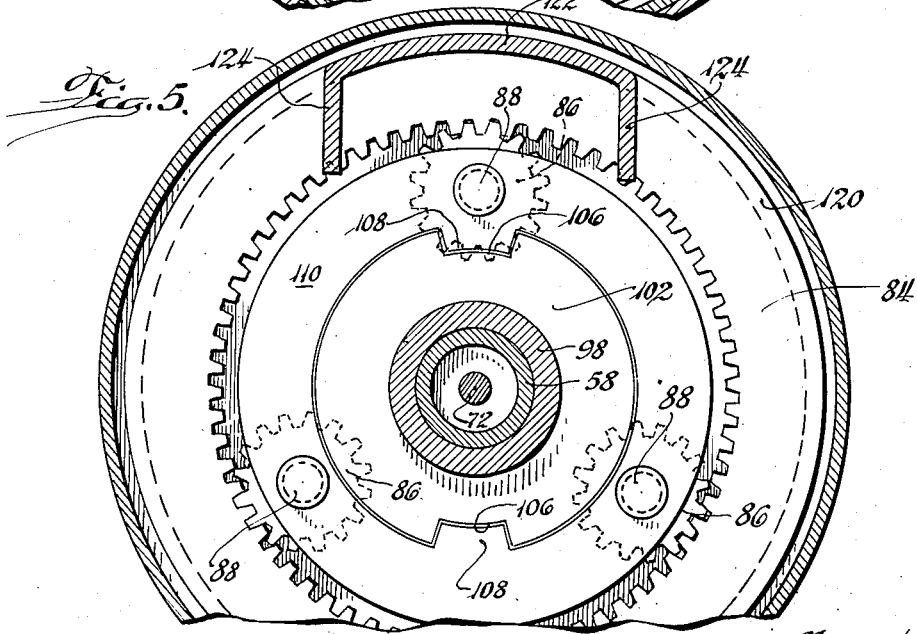
Fig. 5 is a transverse sectional view taken along line 5—5 of Fig. 2

The ring gear 84 meshes with three circumferentially spaced planetary gears 86 supported on three stub shafts 88 fixed in the peripheral edge of a cage disc 90, see Figs 2 and 5. The central portion of the cage disc 90 is offset toward the ring gear disc 82 and shaped to form a hub 92 that is brazed to the intermediate sleeve 58. A thin thrust washer 94 encircling the intermediate sleeve 58 between the cage disc 90 and the ring gear disc 82 prevents the sleeve 58 and its attached parts from shifting in the direction of the shaft 22.

All three planetary gears 86 mesh with a sun gear 96 brazed or otherwise secured to one end of a speed changing sleeve 98 freely rotatable and axially slidable on the intermediate sleeve 58. As shown in Fig. 2, the teeth of the sun gear 96 are formed on the outer end of cylindrical base 100 approximately twice as wide as the gear teeth. About one-third of the sun gear base 100 extend axially beyond the outer end of the supporting sleeve 98 to fit into the space around the cage disc hub 92 when the sleeve 98 is shifted to its "straight drive" position shown in Fig. 2. For this position of the sleeve 98 the sun gear 96, which has a width approximately equal to that of the planetary gear 86, remains in engagement with the planetary gears even though a portion of the teeth of the sun gear extends axially to one side of the planetary gears.

The inner face of the sun gear base 100 abuts against a clutch disc 102 encircling the sleeve 98, to hold the disc against an annular shoulder 104 on the sleeve. The outer periphery of the clutch disc 102 forms radially open, circumferentially spaced recesses 106, Fig. 5, shaped to receive two inwardly extending radial projections 108 formed on a clutch ring 110 fixed to the outer ends of the planetary gear stub shafts 88.

When the speed changing sleeve 98 is in its "straight drive" position shown in Fig. 2, the clutch disc 102 is clutched to the ring 110 to lock the sun gear 96 to the planetary gear cage disc 90. The sun gear 96 holds the planetary gears 86 against rotation on the stub shafts 88. This causes the cage disc 90, together with the sun gear 96 to rotate with the ring gear 84, driving the intermediate sleeve 58 and the driven member 54 at the same speed as the sleeve 26 which rotates the ring gear.

The end of the sleeve 98 opposite from the sun gear 96 is radially enlarged and shaped to form dog clutch members 112 disposed in facing relation to coacting dog clutch members 114 formed on the radial enlarged inner end 116 of the support member 44, which forms an anchor for the sleeve. However, the sleeve 98 is disengaged from the anchor 116 when it is in the "straight drive" position shown in Fig. 2.

Movement of the speed changing sleeve 98 to the right to a second speed position (shown in Fig. 3) engages the sleeve clutch members 112 with the anchoring clutch members 114 to lock the sun gear 96 against rotation. The sun gear 96 remains in engagement with the planetary gears 86 but the clutch disc 102 is disengaged from the clutch ring 110, thus freeing the cage disc 90 for rotation in relation to the sun gear. The ring gear 84 rotates the planetary gears 86 around the sun gear 96 to drive the cage disc 90 and the driven member 54 at a reduced speed.

The speed changing sleeve 98 is automatically shifted from one speed position to the other by a speed responsive control including two diametrically opposed centrifugal weights 118 rotated with the ring gear 84. The weights 118 are carried by a cylindrical member 120 encircling the ring gear 84 and formed over at the outer end to engage the ring gear support disc 82. Two diametrically opposed circumferential segments 122 of the support member 120 are widened to extend inwardly along the medial portion of the speed changing sleeve 98. Opposite ends of each circumferential segment 122 are circumferentially severed from the main body of the cylindrical support member 120 and turned toward the sleeve 98 (see Figs. 2 and 4) and form two pairs of parallel support ears 124, 126 for the respective weights 118. Each pair of support ears 124, 126 straddles one end of its associated control weight 118 and supports opposite ends of a pivot pin 128 extending through the weight.

The main body of each control weight 118 extends to the side of its support pin 128 opposite from the ring gear 84 and has a semicircular crescent shape as viewed along the axis of the intermediate sleeve 58 (see Figs. 2 and 4). Two legs 130 on each weight straddle the anchor member 116.

The two weights 118 are biased toward each other by two tension springs 132, 134 located on opposite sides of the anchor member 116 and connected at opposite ends to projections 136 on the free ends of the respective weights. Swinging movement of the weights toward each other is limited by abutting engagement of the opposed weight legs 130, as shown in Figs. 2 and 4.

Outward swinging movement of each control weight 118 is limited by engagement with the adjacent edge of the supporting circumferential segment 122 of an enlarged head 138 on a cylindrical insert 140 pressed into a radial bore 142 in the central portion of the weight body. Adequate clearance at all times between each rotating weight 118 and the drive casing is assured by an exterior circumferential relief 144 on the outer end of the weight.

Swinging movement of each control weight 118 about its support pin 128 is transmitted to the speed changing sleeve 98 by an inwardly projecting operating member 146 mounted on the supported end of the weight. The inner ends of the operating members 146 are enlarged and rounded to work smoothly in diametrically opposed radial openings 148 formed in an operating ring 150 rotatably mounted on the sleeve 98 between the clutch 102 and an annular shoulder 152 on the enlarged end of the sleeve which supports the dog clutch members 112.

The two control weights 118 are yieldably held together in the positions shown in Figs. 2 and 4 by the tension in the two springs 132, 134 supplemented by the retaining action of two leaf spring detents 156 on opposite sides of the weights. As shown in Figs. 2, 3 and 4, each detent 156 comprises a generally straight leaf spring 158 having one end fixed by a rivet 160 to an external flat 162 on the adjacent leg 130 of one of the two weights 118. The other end of the spring 158 extends a substantial distance beyond the extreme end of the supporting weight leg 130 to press against a generally similar flat 164 formed on the adjacent leg of the other weight 118. The extreme end of the spring 158 is shaped to form a generally circular protuberance 166 projecting toward the flat 164. When the two weights 118 are pulled by the springs 132 to their innermost positions, the protuberances 166 of the two detent springs 158 are pressed into circular openings 168 in the respective flats 164 (see Figs. 2 and 3). The detent action of the leaf springs 158 arises from the forces required to cam the protuberances 166 out of the openings 168 to initially separate the two control weights 118.

A review of the operation of the improved engine driven windshield wiper thus provided may start with the assumption that the clutch member 68 has been disengaged from the driving shaft projection 66 by axial movement of the flexible shaft 12 to the right with reference to Fig. 2. At this time only the shaft 22 is rotated by the gear 18 driven directly by the vehicle engine 16. The weights 118 are in their innermost positions and the speed changing sleeve 98 is located in its "straight drive" position, shown in Fig. 2, locking the sun gear 96 to the planetary gear on the disc 90 in readiness to drive the flexible shaft 12 at the same speed as the ring gear 84.

To start the windshield wiper 10 the clutch member 68 is shifted into engagement with the shaft projection 66 by axial control movement of the flexible shaft 12 in the opposite direction. This couples the engine driven shaft 22 through the driving sleeve 26 to the ring gear 84. If the engine and hence the driving shaft 22 are turning at a moderate speed, the springs 132 and the detents 156 together will maintain the control weights 118 in their innermost positions to continue the one to one ratio straight drive between the driving shaft 22 and the flexible shaft 12 leading to the wiper mechanism 10.

In the event the speed of the vehicle engine 16 is sufficient to drive the shaft 22 and the directly coupled flexible shaft 12 at speeds above a predetermined value (corresponding approximately to the maximum desirable operating speed of the windshield wiper mechanism 10) the centrifugal forces of the two control weights 118 become sufficient to cam the protuberances 166 of the detent springs 158 out of the openings 168 to release the weights. Both weights 118 immediately swing about the pivotal support pins 128 to their extreme outward positions shown in Fig. 3.

This shifts the sleeve 98 to its second speed position, Fig. 3, releasing the cage disc 99 for rotation relative to the sun gear 96 and locking the sun gear to the anchor member 116. The speed of rotation of the cage disc 99 and the flexible shaft 12 is reduced in relation to the speed of the driving shaft 22 to prevent overspeeding of the windshield wiper mechanism 10 while the engine 16 continues to operate at high speed.

When the vehicle engine slows down, the drive operates automatically to speed up the flexible shaft 12 to the full speed of the driving shaft 22 to maintain a satisfactory cleaning speed of the windshield wiper mechanism 10. Thus, when the speed of the ring gear 84 drops below this lower value, the springs 132, 134 move the weights 118 inwardly to shift the speed changing sleeve 98 back to its "straight drive" position shown in Fig. 2. The weights are yieldably held in this position by the detents 156.

The reversible shifting action of the self-controlled drive provides for a speed of rotation of the flexible shaft 12 sufficient to maintain an efficient cleaning action of the windshield wiper mechanism 10 while the vehicle engine 16 is operating slowly without over-speeding the wiper mechanism when the engine is turning at high speed.

Since the combined tension of the two springs 132, 134 which return the control weights 118 to their "straight drive" position is considerably less than the force of the two springs together with the yieldable retaining action of the two detents 156, the engine speed at which the drive will shift back into its straight drive position is considerably lower than that necessary to swing the weights 118 outwardly to reduce the speed of the flexible shaft 12. The resulting overlap of the high speed and low speed ranges of the drive reduces the frequency of shifting to the necessary minimum required to maintain a satisfactory operating speed of the wiper mechanism 10 for all engine speeds.

The self controlled plural speed drive which operates the wiper mechanism 10 is quite compact and well adapted for economical manufacture and assembly.

While I have shown and described a preferred embodiment of my invention, it will be apparent that variations and modifications thereof may be made without departing from the principles and scope of the invention. I therefore desire, by the following claim, to include all such variations and modifications by which substantially the results of my invention may be obtained through the use of substantially the same or equivalent means.

I claim:

A speed compensating drive for operating a vehicle accessory mechanically from the vehicle engine, comprising, in combination, a rotary driving member adapted to be connected mechanically to a vehicle engine, a ring gear, means including a clutch for disengageably connecting said ring gear with said driving member for rotation by the latter, a planetary gear meshing with said ring gear, a rotary support mounted for rotation about the axis of said ring gear and supporting said planetary gear for rotation by said ring gear about the axis of the planetary gear, a rotary accessory driving shaft having one end mounted in coaxial relation with said driving member and forming a driven member, means connecting said driven member to said rotary planetary gear support for rotation therewith and axial movement relative thereto, a sun gear continuously meshing with said planetary gear, a locking member nonrotatably connected with said planetary gear support, a stationary anchoring member, control means nonrotatably connected with said sun gear and shiftable along the axis of said driving member between a first operative position and a second operative position, said control means including first clutch means thereon engageable with said locking member on said planetary gear support upon movement of the control means to said first position and braking means thereon engageable with said anchoring member to hold said sun gear against turning movement upon shifting movement of the control means to said second position, spring means connected to urge said control means from said second position toward said first position, centrifugal weight means movably mounted on said ring gear for rotation therewith and radial movement thereon and connected with said control means for shifting the latter from said first position to said second position to decrease the speed of said accessory driving shaft in relation to the speed of said driving member as a consequence of the increase in speed of the driving member above a predetermined value, and an actuator connected between said accessory driving shaft and said clutch for engaging and disengaging the clutch upon axial control movement of the shaft axially in opposite directions.

References Cited in the file of this patent

UNITED STATES PATENTS

| | | |
|---|---|---|
| 1,401,659 | Ward | Dec. 27, 1921 |
| 1,839,145 | Forichon | Dec. 29, 1931 |
| 2,198,072 | Banker | Apr. 23, 1940 |
| 2,225,121 | Lundquist | Dec. 17, 1940 |